United States Patent [19]

Satokawa et al.

[11] 3,904,575

[45] Sept. 9, 1975

[54] FLUOROCARBON POLYMER COMPOSITION AND PRODUCTION AND USE THEREOF

[75] Inventors: Takaomi Satokawa, Osaka; Tuneo Fujii, Suita; Norimasa Honda, Settsu; Kozo Asano, Ibaragi; Yukiharu Nakamura, Ibaragi; Seisuke Suzue, Takatsuki, all of Japan

[73] Assignee: Daikin Kogyo Co., Ltd., Japan

[22] Filed: May 31, 1973

[21] Appl. No.: 365,406

Related U.S. Application Data

[63] Continuation of Ser. No. 56,983, July 21, 1970, abandoned.

[30] Foreign Application Priority Data

July 21, 1969  Japan.............................. 44-57522
July 21, 1969  Japan.............................. 44-57523

[52] U.S. Cl. ...... 260/32.8 R; 260/29.6 F; 260/30.2; 260/33.6 F; 260/900
[51] Int. Cl.$^2$.. C08K 5/07; C08K 5/01; C08L 27/20
[58] Field of Search ...... 260/32.8 R, 33.6 F, 32.6 R, 260/900, 29.6 F, 33.4 F, 33.8 F

[56] References Cited
UNITED STATES PATENTS

| | | | |
|---|---|---|---|
| 3,427,276 | 2/1969 | Hahn ................. | 260/32.6 |
| 3,637,569 | 1/1972 | Fang .................. | 260/32.8 R |
| 3,682,859 | 8/1972 | Taylor ................ | 260/33.6 F |
| 3,769,252 | 10/1973 | Fujii .................. | 260/32.8 R |

FOREIGN PATENTS OR APPLICATIONS

| | | |
|---|---|---|
| 1,064,840 | 1965 | United Kingdom |
| 486,628 | 1952 | Canada |

*Primary Examiner*—Joseph L. Schofer
*Assistant Examiner*—P. R. Michl
*Attorney, Agent, or Firm*—Craig & Antonelli

[57] ABSTRACT

A stable, substantially anhydrous organosol of tetrafluoroethylene polymer and tetrafluoroethylene-hexafluoropropylene copolymer prepared by evaporating a mixture of an aqueous dispersion of tetrafluoroethylene polymer having a particle size of about 0.05 to 0.5 micron, an average particle size of about 0.1 to 0.3 micron and a standard specific gravity of about 2.20 to 2.29 and an aqueous dispersion of tetrafluoroethylene-hexafluoropropylene copolymer having a particle size of about 0.01 to 0.3 micron, an average particle size of about 0.05 to 0.2 micron, a specific melt viscosity at 380°C of about $1 \times 10^3$ to $10^6$ poise and a ratio by weight of tetrafluoroethylene:hexafluoropropylene of about 95/5 to 5/95 in the presence of an organic solvent which is insoluble or hardly soluble in water, forms an azeotropic mixture with water and does not interfere chemically or physically with the polymers so as to remove water azeotropically from the system, if necessary, followed by minimizing the particles of the polymers. The organosol is admixed with a film-forming material to make a composition for coating, which is applicable on a metal plate to form a film of excellent properties such as adhesiveness, hardness, self lubricating, anti-sticking and wear resistant properties.

24 Claims, No Drawings

FLUOROCARBON POLYMER COMPOSITION AND PRODUCTION AND USE THEREOF

This is a continuation of application Ser. No. 56,983, filed July 21, 1970, now abandoned.

The present invention relates to a fluorocarbon polymer composition, and production and use thereof. In one aspect of the invention, it is concerned with a stable, substantially anhydrous organosol comprising tetrafluoroethylene polymer (hereinafter referred to as "PTFE") and tetrafluoroethylene-hexafluoropropylene copolymer (hereinafter referred to as "FEP") dispersed in an organic solvent. In another aspect of the invention, it is concerned with a composition for coating which comprises the said organosol and a film-forming material.

In Japanese Pat. No. 12,521/1962, there is described an aqueous dispersion of PTFE and FEP obtained by admixing aqueous dispersions of PTFE and of FEP with each other. Further, organosols of FEP and of PTFE are described in British Pat. No. 1,064,840, British Pat. No. 1,094,349 and U.S. Pat. No. 2,937,156. In addition, it may be inferred that an organosol is more favorable than an aqueous dispersion in the incorporation of such additives as a film-forming material therein. Actually, however, there has never been provided any stable organosol comprising PTFE and FEP. This is probably due to the difficult production of a stable organosol of PTFE. As described in British Pat. No. 1,064,840, a substantially anhydrous organosol of FEP is readily obtainable by admixing an aqueous dispersion of FEP with an organic solvent which gives an azeotropic mixture with water and heating the resultant mixture so as to remove azeotropically water therefrom. The application of such an azeotropic procedure to an aqueous dispersion of PTFE, however, can afford an organosol of PTFE only in an extremely low concentration, and attempts to enhance the PTFE concentration to 2 % or more result in coagulation of PTFE particles. Although the dilute PTFE organosol is miscible with an organosol of FEP to afford a stable PTFE-FEP organosol, the content of PTFE therein is insufficient and unsatisfactory for the desired object. U.S. Pat. No. 2,937,156 describes the preparation of a PTFE organosol by heating carefully an aqueous dispersion of PTFE with an organic solvent soluble in water and having a boiling point higher than 100°C in the presence of a large amount of a surface active agent under reduced pressure, but the resultant PTFE organosol contains large amounts of water and/or the surface active agent and is per se not sufficiently stable. Therefore, an admixture of such PTFE organosol with a FEP organosol can never afford a stable organosol of PTFE and FEP. Moreover, the presence of large amounts of water and/or the surface active agent is not favorable for incorporation of additives such as a film-forming agent therein. According to the procedure described in British Pat. No. 1,094,349, an organosol of PTFE dispersed in formamide can be provided, but such organosol again contains relatively large amounts of a suface active agent and water.

As the result of various studies, it has been found that a stable, substantially anhydrous organosol of PTFE-FEP can be prepared by applying the procedure as described in British Pat. No. 1,064,840 to a mixture of an aqueous dispersion of PTFE and an aqueous dispersion of FEP. This finding is quite interesting and of unexpected nature, because the application of the same procedure to an aqueous dispersion of PTFE can not give a satisfactory organosol of PTFE. The present invention is based on the said finding.

According to the present invention, a stable, substantially anhydrous organosol of PTFE-FEP can be prepared by heating a mixture of an aqueous dispersion of PTFE having a particle size of about 0.05 to 0.5 micron, an average particle size of about 0.1 to 0.3 micron and a standard specific gravity of about 2.20 to 2.29 and an aqueous dispersion of FEP having a particle size of about 0.01 to 0.3 micron, an average particle size of about 0.05 to 0.2 micron, a specific melt viscosity at 380°C of about $1 \times 10^3$ to $10^6$ poise and a ratio by weight of tetrafluoroethylene:hexafluoropropylene of about 95/5 to 5/95 in the presence of an organic solvent which is insoluble or hardly soluble in water, forms an azeotropic mixture with water and does not interfere chemically or physically with the polymers so as to remove water azeotropically from the system.

The PTFE particles in the said aqueous dispersion of PTFE are spheress having a particle size of about 0.05 to 0.5 micron, an average particle size of about 0.1 to 0.3 micron and a standard specific gravity of about 2.20 to 2.29. They can be produced by the method described in U.S. Pat. No. 2,559,752 or U.S. Pat. No. 2,750,350. The aqueous dispersion of such PTFE is, however, presently available on the market.

The term "standard specific gravity" used hereinabove indicates the degree of polymerization of PTFE and may be determined as follows:

The PTFE powder (5 g) obtained by coagulation of an aqueous dispersion of PTFE is molded in a cylinder of 30 mm in diameter under a pressure of 300 kg/cm². The obtained disc of 30 mm in diameter and 3 mm in height is baked in a bath of potassium nitrate-sodium nitrate at 360°C for about 40 minutes. The bath temperature is lowered to 300°C at a rate of 20°C/hour, and then the disc is allowed to cool in the atmosphere to room temperature. The resultant molded product is subjected to measurement of the specific gravity at 23°C/23°C using n-butanol by a conventional balance method.

The FEP particles in the said aqueous dispersion of FEP are spheres having a particle size of about 0.01 to 0.3 micron, an average particle size of about 0.05 to 0.2 micron, a specific melt viscosity at 380°C of about $1 \times 10^3$ to $10^6$ poise and a ratio by weight of tetrafluoroethylene:hexafluoropropylene of 95/5 to 5/95, preferably 90/10 to 50/50 (particularly 90/10 to 70/30). They can be readily produced by the method described in U.S. Pat. No. 2,946,763. The aqueous dispersion of such FEP is, however, presently available on the market.

The said "specific melt viscosity" is the value by poise which is determined using a melt indexer as described in ASTM D-1238-52T as follows:

The FEP polymer is filled in a cylinder of 9.5 mm in inner diameter retained at 380 ± 5°C and, after allowing it to stand for 5 minutes, receives a load of 5,000 g whereby it is extruded through a nozzle of 0.21 mm in inner diameter and 8 mm in length. 53,150 is divided by the extrusion rate (g/min) to give the objective value.

The proportion of the aqueous dispersion of PTFE and the aqueous dispersion of FEP to be admixed according to the present invention varies with the degree of polymerization of PTFE. Thus, the proportion may be appropriately selected in consideration of the degree of polymerization of PTFE for production of the objective stable organosol wherein PTFE and FEP particles are dispersed in the colloidal state. In general, a higher degree of polymerization of PTFE requires a smaller content of PTFE in the proportion. For instance, the organosols prepared by the present invention using a commercially available aqueous dispersion of PTFE (standard specific gravity, 2.230) and a commercially available aqueous dispersion of FEP (specific melt viscosity at 380°C, 4 × 10$^4$ poise) in various mixing proportions and with methylisobutylketone show dispersion states as follows:

| Mixing proportion (% by weight) PTFE | FEP | Dispersion state of organosol |
|---|---|---|
| 5 | 95 | quite uniformly dispersed |
| 10 | 90 | quite uniformly dispersed |
| 15 | 85 | quite uniformly dispersed |
| 20 | 80 | uniformly dispersed |
| 30 | 70 | uniformly dispersed |
| 40 | 60 | partly coagulated |
| 50 | 50 | considerably coagulated |
| 60 | 40 | completely coagulated |

From such results, it is understood that, when a commercially available aqueous dispersion of PTFE with high molecular weight is used, the mixture is preferred to contain not more than 30% by weight of PTFE. When an aqueous dispersion of PTFE with standard specific gravity of 2.287 is used, an uniformly dispersed organosol is obtained even if the organosol contains 60% by weight of PTFE.

Specific examples of the organic solvent used in carrying out the present invention are aromatic hydrocarbons (e.g. benzene, toluene, xylene), ketones (e.g. methylisobutylketone, diisobutylketone) and the like. Particularly preferred are toluene and methylisobutylketone. The use of an organic solvent having a boiling point higher than that of water and being soluble in water will afford a PTFE-FEP organosol which is, however, not anhydrous because of difficulty in removing water completely therefrom. Further, the use of such water-miscible organic solvent having a lower boiling point than that of water as acetone is not suitable, because water can be not completely eliminated by distillation and causes a coagulation of the colloidal dispersion.

The preparation of the organosol of the invention is usually accomplished by adding dropwise the aqueous dispersions of PTFE and of FEP to an organic solvent as defined above while boiling so as to remove azeotropically the water in the dispersion with the organic solvent. The aqueous dispersions of PTFE and of FEP may be admixed with each other prior to the addition or added individually to the boiling organic solvent. Sometimes, an organosol of FEP is first prepared to a certain extent and then a mixture of the aqueous dispersions of PTFE and of FEP is added thereto. The azeotropic mixture removed from the system is separated into water and the organic solvent on cooling and the organic solvent may be recycled to the system. Heating for azeotropic distillation is continued until no water is recognized in the distillate, at which time the temperature of the distillate indicates the boiling point of the organic solvent. The thus obtained organosol of PTFE and FEP is substantially anhydrous and the water content therein is less than 0.1 % by weight, usually less than 0.05 % by weight.

The procedure of this invention may be carried out either under reduced pressure or under atmospheric pressure.

In the organosol as above prepared, the polymer particles may be sometimes partially coagulated. Therefore, it is usually preferred to minimize the polymer particles by treatment of the organosol, for instance, with a ball mill or a pebble mill of conventional type for 30 minutes to 72 hours at a temperature below 30°C, preferably below 20°C, and above the solidifying point of the organic solvent or such temperature at which the viscosity of the organic solvent is so high as to make the action of the mill uneffective. The treatment at a temperature above 30°C may rather cause unfavorable coagulation of the polymer particles when the degree of polymerization of PTFE or the content of PTFE is high.

When an organosol is incorporated with a film-forming material as hereinafter stated, the above minimization is not necessarily required at this stage and may be carried out after the incorporation.

The PTFE-FEP organosol of the invention contains usually 5 to 40 % by weight, preferably 20 to 30 % by weight, of polymer with particle size of 0.01 to 3 microns, normally 0.01 to 2 microns. When the content is more than 40 % by weight, the viscosity increases so that the organosol can be handled with difficulty and the particles therein may be secondarily coagulated on storage. The coagulated particles after storage for a long period can be readily redispersed by a simple operation such as mechanical agitation if the content is from 20 to 30 % by weight. A higher stability of the PTFE-FEP organosol is generally obtained by a lower degree of polymerization of PTFE or a lower content of PTFE. The PTFE-FEP organosol of the invention can be ordinarily stored at room temperature but, when the degree of polymerization of PTFE or the content of PTFE is high, it is preferred to store at a temperature lower than 20°C to prevent coagulation. If necessary, the PTFE-FEP organosol of the invention may be diluted with any other appropriate organic solvent, or the organic solvent in the organosol may be replaced by any other suitable organic solvent.

The organosol of the invention is per se used for treatment of paper, cloth, metal plate and so on. For instance, the material to be treated may be sprayed with or dipped in the organosol and then dried to form a coating layer thereon. When the thus treated material is baked at 280° to 420°C, preferably at 290° to 380°C, for 5 to 30 minutes, the formation of a uniform and tough film is accomplished.

It is clear to those skilled in the art that a mixture of an aqueous dispersion of PTFE and that of FEP which contains more than 40% by weight of FEP can not be casted into a film without mud cracks. On the other hand, a PTFE-FEP organosol of the invention can be casted or coated uniformly even when the organosol contains up to 90% by weight of FEP.

The film formed on a metal plate using a mixture of the aqueous dispersions of PTFE and of FEP is peeled off with relative ease, whereas the film formed by the use of the organosol of the invention is much firmly adhered on a metal plate and can be not readily eliminated. Compared with the film of PTFE alone, the film of PTFE-FEP of the invention is much more tough and resistant to abrasion. The coefficient of friction of the PTFE-FEP film is normally about 0.035 to 0.05 which is much lower than that of a FEP film (i.e. about 0.055 to 0.075). Moreover, the PTFE-FEP film is excellent in anti-sticking property. Thus, the PTFE-FEP film formed by the use of the organosol of the invention is much better than the PTFE or FEP film in industrial use.

Alternatively, the PTFE-FEP organosol of the invention may be incorporated with a film-forming material to afford an advantageous composition for coating. Since the organosol is quite stable and substantially anhydrous, the uniform blending of a film-forming agent therein can be accomplished with ease. Examples of the film-forming material include thermoplastic and thermosetting polymers having per se a film-forming property such as nitrocellulose, cellulose acetate butyrate, alkyd resin, polyester, polyurethane, phenol-formaldehyde resin, urea-formaldehyde resin, melamine-formaldehyde resin, epoxy resin, polychlorotrifluoroethylene, polyvinylidene fluoride, polyvinyl fluoride and the like.

Besides the thermoplastic and thermosetting polymers as above exemplified, there may be also used as a film-forming material a heat resistant polymer which does not decompose at a temperature higher than the melting point of a mixture of PTFE and FEP or its precursor. Examples of such polymer and precursor are polyimide, polyamide, polyamidoimide, polyoxadiazole, polybenzimidazole, polysiloxane, etc.

On incorporation into the organosol, the film-forming material may be used in the form of solution or organosol. The proportion of the film-forming material and the organosol may be 5/95 to 90/10, preferably 30/70 to 70/30 by weight.

The thus obtained composition may be applied to various materials such as paper, cloth and metal plates in the same manner as illustrated above on the use of the organosol itself. On drying in the atmosphere or heating, the coating layer on the surface of the applied material is hardened to form a film of low coefficient of friction and high anti-sticking property. Compared with the organosol itself, the composition incorporated with a film-forming material is advantageous in the applicability to various materials at a much lower temperature. Thus, the composition is applicable to materials which are poorly resistant to heat and unable to receive the application of the organosol.

The film formed by the use of the composition as above obtained is advantagous in high adhesiveness, toughness, self lubricating and anti-sticking properties. It is more abrasion-resistant than a film of PTFE alone and has a much lower coefficient of friction and much more excellent anti-sticking than those of a FEP film.

Practical and presently-preferred embodiments of the present invention are illustratively shown in the following Examples where parts are by weight.

In the Examples, the methods for measurement of the physical properties are as follows:

Coefficient of friction: Measurement is made by the Bowden-Leben apparatus using a steel ball of 8 mm in diameter with a rate of 0.23 cm/sec and a load of 1 kg.

Taber abrasion: Weight loss is measured by using the Taber abrasion tester with abrasion wheels CS17 and 1 kg load on each wheel after 1,000 rotations.

Wear resistance: Weight loss is measured by using a polished rotating disc SUS-23B with a sliding rate of 2.3 m/sec and a load of 0.57 kg/cm$^2$ for 10 minutes.

Erichsen test: The adhesion state of a film when the film is dented from the opposite side so as to make 10 mm high at the center of a hemisphere is observed.

Scratch test: Measurement is carried out by using the Toyo spiral scratch test machine with 300 g load.

Pencil hardness: A pencil of decided hardness, being held onto the coated surface at an angle of 45° under 1 kg load, is moved more than 5 mm distance to scratch the surface and the upper limit of hardness which does not afford any scratch on the surface.

Hydrophobic and oleophobic properties:

Each one drop of 0.04 % aqueous solution of ammonium perfluorooctanoate and n-hexadecane is placed on the coated surface of a horizontally kept plate from an injector. The plate is inclined to an angle of 45°C. By observing the trace of the aqueous solution and the paraffin, judgement is made.

EXAMPLE 1

In a glass flask equipped with a stirrer, a refluxing cooler and a dropping funnel, there is charged methylisobutylketone (385 parts), and the content is heated to reflux with stirring. Then, a mixture of an aqueous dispersion of PTFE (polymer content, 60 % by weight; "Polyflon Dispersion D-1" manufactured by Daikin Kogyo Co., Ltd.) (25 parts) and an aqueous dispersion of FEP (polymer content, 50 % by weight; "Neoflon Dispersion ND-1" manufactured by Daikin Kogyo Co., Ltd.) (70 parts) is dropwise added thereto through the dropping funnel. The water in the dispersion is azeotropically distilled out with methylisobutylketone, and the distillate is condensed in the refluxing cooler and lead to a separator where the methylisobutylketone and the water are separated into two layers. The methylisobutylketone of the upper layer is recycled into the glass flask and the water layer of the lower layer is taken out from the bottom of the separator. The temperature of the distillate first shows 116°C, i.e. the boiling temperature of methylisobutylketone, but is gradually lowered with addition of the dispersion to 89° C. Addition of the dispersion is accomplished in about 1.5 hours. From shortly before accomplishment of the addition, the temperature of the distillate raises gradually. Heating and stirring are continued so that the temperature of the distillate finally reaches to 116°C and any water drop becomes unrecognized in the distillate. Heating under stirring is further continued for about 15 minutes to distill out water (about 45 parts) and a small amount of methylisobutylketone. Then, the resultant dispersion is cooled to room temperature whereby a pale yellow, semi-transparent organosol (200 parts) containing 25.0 % by weight of PTFE and FEP particles (3:7 by weight) is obtained.

Since a small amount of crude particles is contained, the organosol is admitted in a ball mill pot of 13 cm in diameter and rotated with 110 r.p.m. at 15°C overnight. The resultant organosol is quite stable, contains particles of 0.1 to 0.3 microns in size without particles of more than 3 microns. The water content determined by the Karl-Fischer method is 0.015 % by weight.

EXAMPLE 2

The procedure as in Example 1 is carried out using toluene in place of methylisobutylketone. The temperature of the distillate shows first 108°C, i.e. the boiling temperature of toluene, but is gradually lowered to 86°C. Addition of the dispersion is accomplished in about 1.5 hours. The temperature of the distillate then raises to 108°C and any water drop becomes unrecognized in the distillate. Heating under stirring is further continued for about 20 minutes to distill out water (about 41 parts) and a small amount of toluene. Then, the resultant dispersion is cooled to room temperature whereby a white organosol (181 parts) containing 22.0 % by weight of PTFE and FEP particles (3:7 by weight) is obtained.

The organosol is admitted in a ball mill pot of 13 cm in diameter and rotated with 110 r.pm. at 18°C overnight. The resultant organosol is quite stable and contains particles of 0.1 to 0.3 microns in size. The water content is 0.009 % by weight.

EXAMPLE 3

An organosol (200 parts) containing 25 % by weight of PTFE and FEP particles (3:7 by weight), prepared as in Example 1, is allowed to stand for 3 days, during which the supernatant is removed once a day. The concentration of the polymer particles reaches to 28 % by weight on the last day of the duration. The resultant organosol (150 parts) and acetylene carbon (manufactured by Columbia Carbon Co., Ltd.) (7 parts) are admitted to a ball mill pot of 13 cm in diameter and rotated with 110 r.p.m. at 20°C for 15 hours to give a stable, black organosol containing no coagulum.

EXAMPLE 4

Organosols are prepared as in Example 1 with variations in the ratio of PTFE and FEP and filtered through a 150 mesh screen. Each organosol is applied on a sand-blasted aluminum plate to make a film. The plate is dried in an infrared dryer for about 30 minutes and heated at 290°C for 30 minutes so as to harden the film of the applied organosol. The physical properties of the film are shown in Table 1 where those of a PTFE film and a FEP film are also shown.

EXAMPLE 5

In a ball mill pot of 13 cm in diameter, there are charged an organosol (200 parts) obtained in Example 1, polyamidoimide resin ("HI-200" manufactured by Hitachi Chemical Co., Ltd.) (180 parts), N-methyl-2-pyrrolidone (110 parts), carbon (6 parts) and titanium oxide (1 part), and the pot is rotated with 110 r.p.m. at 23°C for 48 hours. The contents are taken out and filtered through a 150 mesh screen. The viscosity of the resulting enamel when determined using Ford Cup No. 4 is 30 seconds, and the content of solid materials therein is 21.6 % by weight. The enamel is sprayed on an aluminum plate with a pressure of 3 kg/cm² using a spray gun having a nozzle of 0.8 mm in diameter to make a film, and the plate is dried in an infrared dryer for 30 minutes and heated to harden the film. The properties of the hardened film are shown in Table 2 (A).

In the same manner as above, an organosol (200 parts) prepared as in Example 1 but using an aqueous dispersion of FEP (polymer content, 50 % by weight; "Neoflon Dispersion ND-1") (100 parts) in place of a mixture of PTFE dispersion and FEP dispersion and containing 25.0 % by weight of FEP is admixed with additives, and the resulting enamel is applied on an aluminum plate to form a film, of which the properties are shown in Table 2 (B).

EXAMPLE 6

In a ball mill pot, there are charged epoxy resin ("Araldite PZ-985E" manufactured by Ciba Ltd.) (60 parts), a hardener ("Hardner HZ-985E" manufactured by Ciba Ltd.) (20 parts), toluene (5 parts), diacetonealcohol (10 parts), carbitol (5 parts) and chromium oxide (6 parts), and the pot is rotated with 110 r.p.m. at 23°C for 5 hours. After addition of an organosol (130 parts) obtained in Example 1 thereto, the rotation is continued for 48 hours. Then, the resulting product is filtered through a 150 mesh screen to give a composition having a viscosity of 40 seconds when measured using Ford Cup No. 4 and containing solid materials in 35 % by weight concentration.

The composition is sprayed on a sand-blasted aluminum plate with a pressure of 2 kg/cm² using a spray gun having a nozzle of 0.8 mm in diameter to make a film. The plate is dried in an infrared dryer for 30 minutes and heated at 180°C for 30 minutes to harden the film. The physical properties of the hardened film are shown in Table 3 (A).

Tetrafluoroethylene telomer wax prepared according to the method described in U.S. Pat. No. 3,067,262 (100 parts) is charged in a ball mill pot of 15 cm in diameter, methylisobutylketone (130 parts) and cobalt green (16.6 parts) as a pigment are added thereto and the resultant mixture is milled with 270 r.p.m. for 48 hours. Then, epoxy resin ("Araldite PZ-985E") (348 parts) and a hardener ("Hardner HZ-985E") (116 parts) are added to the resulting mixture, and mixing is carried out with 110 r.p.m. for 2 hours. The thus obtained composition is further admixed with a mixture of methylisobutylketone, N-methyl-2-pyrrolidone and diacetonealcohol (89:18:35 by weight) (142 parts), mixed with 110 r.p.m. for 5 minutes and filtered through a 150 mesh screen. The composition having a viscosity of 33 seconds when measured using Ford Cup No. 4 and containing solid materials in 40.9 % by weight concentration is applied on an aluminum plate as above to form a film, of which the physical properties are shown in Table 3 (B).

EXAMPLE 7

In a ball mill pot of 13 cm in diameter, there are charged an organosol (83 parts) obtained in Example 1, cellulose resin (solid material content, 30 % by weight; "Celpar No. 30" manufactured by Kansai Paint Co., Ltd.) (300 parts), chromium oxide (9 parts), titanium oxide (2.3 parts) and butyl acetate (100 parts), and the pot is rotated with 110 r.p.m. for 48 hours. The resulting product is filtered through a 150 mesh screen to give a composition having a viscosity of 40 seconds when measured using Ford Cup No. 4 and containing solid materials in 22.6 % by weight concentration.

The composition is sprayed on a sand-blasted aluminum plate with a pressure of 3 kg/cm² using a spray gun having a nozzle of 0.8 mm in diameter to make a film. The plate is dried in an infrared drier at 60° to 80°C for 30 minutes to harden the film. Thus, a dense and flat coating is attained.

EXAMPLE 8

Organosols are prepared as in Example 1 with variations in the ratio of PTFE and FEP. Each organosol (200 parts), polyamidoimide resin (solid material content, 27 % by weight; "HI-500" manufactured by Hitachi Chemical Co., Ltd.) (328 parts), N-methylpyrrolidone (200 parts), chromium oxide (24 parts) and titanium oxide (24 parts) are charged in a ball mill and kneaded well at 28°C for 48 hours. The contents are filtered through a 150 mesh screen. The resultant composition is sprayed on a sand-blasted aluminum plate to form a film, which is dried in an infra-red dryer for 30 minutes and baked at 280°C for 30 minutes. The physical properties of the film are shown in Table 4 (A).

In the same manner as above but using a sole mixture of a PTFE organosol and a FEP organosol in place of the PTFE-FEP organosol, there is prepared a composition, which is coated on a sand-blasted aluminum plate by spraying to make a film thereon. The physical properties of the film after drying and baking are shown in Table 4 (B).

Table 1

| No. | Composition of polymers (ratio by weight) | Stability of organosol | Film thickness ($\mu$) | Taber abrasion (mg) | Wear resistance (mg/cm$^2$) | Erichsen test | Scratch test | Pencil hardness | Coefficient of friction |
|---|---|---|---|---|---|---|---|---|---|
| 1 | PTFE:FEP (5:95) | extremely stable | 25 | 21 | 0.15 | good | excellent | 3H | 0.045 |
| 2 | PTFE:FEP (10:90) | extremely stable | 26 | 17 | 0.15 | good | excellent | 3H | 0.040 |
| 3 | PTFE:FEP (20:80) | stable | 25 | 17 | 0.10 | good | excellent | 3H | 0.035 |
| 4 | PTFE:FEP (30:70) | stable | 28 | 15 | 0.11 | good | excellent | 3H | 0.030 |
| 5 | PTFE:FEP (40:60) | partly coagulated | 27 | 15 | 0.10 | good | excellent | 3H | 0.035 |
| Control | PTFE | — | 20 | 11 | 24 | good | good | F | 0.030 |
| Control | FEP | — | 15 | 16 | 0.10 | good | (excellent | 3H | 0.060 |

Table 2

| Coating | Film thickness (micron) | Coefficient of friction | Before abrasion | | | | | | After abrasion | | |
| | | | Taber abrasion (mg) | Wear resistance (mg/cm$^2$) | Scratch test | Pencil hardness | Erichsen test | Oil and water repellency | Film thickness ($\mu$) | Coefficient of friction | Oil and water repellency |
|---|---|---|---|---|---|---|---|---|---|---|---|
| (A) | 45 | 0.040 | 17 | 0.1 | excellent | 3H | good | excellent | 30 | 0.045 | excellent |
| (B) | 44 | 0.055 | 20 | 0.1 | excellent | 3H | good | excellent | 25 | 0.150 | bad |

Table 3

| Coating | Film thickness (micron) | Coefficient of friction | Before abrasion | | | | | | After abrasion | | |
| | | | Taber abrasion (mg) | Wear resistance (mg/cm$^2$) | Scratch test | Pencil hardness | Erichsen test | Oil and water repellency | Film thickness ($\mu$) | Coefficient of friction | Oil and water repellency |
|---|---|---|---|---|---|---|---|---|---|---|---|
| (A) | 45 | 0.040 | 25 | 0.2 | excellent | 3H | excellent | good | 25 | 0.040 | good |
| (B) | 45 | 0.040 | 160 | 0.3 | excellent | F | excellent | bad | 20 | 0.040 | bad |

Table 4

| Composition (ratio by weight) PTFE/FEP | (A) | | | | | | (B) | | | | | |
| | Before abrasion | | | After abrasion | | | Before abrasion | | | After abrasion | | |
| | Film thickness (micron) | Coefficient of friction | Oil and water repellency | Film thickness (micron) | Coefficient of friction | Oil and water repellency | Film thickness (micron) | Coefficient of friction | Oil and water repellency | Film thickness (micron) | Coefficient of friction | Oil and water repellency |
|---|---|---|---|---|---|---|---|---|---|---|---|---|
| 0/100 | 45 | 0.05–0.06 | excellent | 25 | 0.10–0.15 | poor | 43 | 0.05–0.06 | excellent | 24 | 0.10–0.15 | poor |
| 10/90 | 44 | 0.040 | excellent | 25 | 0.04–0.06 | fair | 43 | 0.040 | excellent | 25 | 0.10–0.12 | poor |
| 20/80 | 45 | 0.040 | excellent | 24 | 0.045 | good | 45 | 0.045 | excellent | 25 | 0.08–0.12 | poor |
| 30/70 | 43 | 0.035 | excellent | 23 | 0.035 | good | 44 | 0.035 | excellent | 23 | 0.07–0.09 | poor |
| 40/60 | 43 | 0.030 | excellent | 24 | 0.035 | good | 42 | 0.030 | excellent | 24 | 0.05–0.08 | poor |
| 50/50 | 44 | 0.035 | excellent | 23 | 0.035 | good | 45 | 0.035 | excellent | 25 | 0.05–0.06 | fair |

What is claimed is:

1. A stable, substantially anhydrous organosol consisting essentially of about 5 to 40% by weight of particles of polytetrafluoroethylene and particles of tetrafluoroethylene-hexafluoropropylene copolymer dispersed in an organic solvent which is insoluble or hardly soluble in water, forms an azeotropic mixture with water and does not interfer chemically or physically with the polytetrafluoroethylene and the copolymer, the weight ratio of the polytetrafluoroethylene to the copolymer being from 5 : 95 to 50 : 60 and the particle size of said polytetrafluoroethylene and the copolymer being about 0.01 to 3 microns.

2. The organosol according to claim 1, wherein the ratio of tetrafluoroethylene to hexafluoropropylene in the copolymer is about 95/5 to 5/95.

3. The organosol according to claim 1, having a water content therein of less than 0.1% by weight.

4. The organosol according to claim 1, having a water content therein of less than 0.05% by weight.

5. The organosol according to claim 1, which contains 20 to 30% by weight of the particles of polytetrafluorethylene and particles of tetrafluoroethylene-hexafluoropropylene copolymer.

6. The organosol according to claim 1, wherein the organic solvent is selected from the group consisting of aromatic hydrocarbons and ketones.

7. The organosol according to claim 2, wherein the ratio of tetrafluoroethylene to hexafluoropropylene in the copolymer is from 90/10 to 50/50.

8. The organosol according to claim 2, wherein the ratio of tetrafluoroethylene to hexafluoropropylene in the copolymer is from 90/10 to 70/30.

9. The organosol according to claim 5, wherein the particle size ranges from 0.01 to 2 microns.

10. The organosol according to claim 6, wherein the solvent is selected from the group consisting of benzene, toluene, methylisobutylketone and diisobutylketone.

11. The organosol according to claim 1, wherein the content of the particles of polytetrafluoroethylene is not more than about 30% by weight on the basis of the whole polymer particles.

12. The organosol according to claim 1, wherein the organic solvent is toluene or methylisobutylketone.

13. A composition for coating which comprises the organosol according to claim 1 and a film-forming material incorporated therewith in a proportion of 95:5 to 10:90 by weight.

14. A composition for coating according to claim 13, wherein the proportion of the organosol to film-forming material is from 70/30 to 30/70.

15. A process for preparing the organosol according to claim 1, which comprises evaporating a mixture of an aqueous dispersion of polytetrafluoroethylene having a particle size of about 0.05 to 0.5 micron, an average particle size of about 0.1 to 0.3 micron and a standard specific gravity of about 2.20 to 2.29 and an aqueous dispersion of tetrafluoroethylenehexafluoropropylene copolymer having a particle size of about 0.01 to 0.03 micron, an average particle size of about 0.05 to 0.2 micron, a specific melt viscosity at 380°C. of about $1 \times 10^3$ to $10^6$ poise and a ratio by weight of tetrafluoroethylene: hexafluoropropylene of about 95/5 to 5/95 in the presence of the said organic solvent so as to remove water azeotropically from the system.

16. The composition of claim 13, wherein said film-forming material is a polymer having a film-forming property.

17. The composition of claim 16, wherein said film-forming polymer includes thermoplastic and thermosetting polymers and heat-resistance polymer which does not decompose at a temperature higher than the melting point of a mixture of the polytetrafluorethylene and the tetrafluoroethylene-hexafluoropropylene copolymer or a precursor of said heat-resistant polymer.

18. The composition of claim 17, wherein said thermoplastic and thermosetting polymers include nitrocellulose, cellulose acetate tutyrate, alkyd resin, polyester, polyurethane, phenol-formaldehyde resin, ureaformaldehyde resin, melamine-formaldehyde resin, epoxy resin, polychlorotrifluoroethylene, polyvinylidene fluoride and polyvinyl fluoride and said heat-resistant polymer or precursor thereof includes polyimide, polyamide, polyamidoimide, polyoxadiazole, polybenzimidazole, and polysiloxane.

19. A stable, substantially anhydrous organosol consisting of about 5 to 40% by weight of particles of polytetrafluoroethylene and particles of tetrafluoroethylene-hexafluoropropylene copolymer dispersed in an organic solvent which is insoluble or hardly soluble in water, forms an azeotropic mixture with water and does not interfere chemically or physically with the polytetrafluoroethylene and the copolymer, the weight ratio of the polytetrafluoroethylene to the copolymer being from 5 : 95 to 40 : 60 and the particle size of said polytetrafluoroethylene and the copolymer being about 0.01 to 3 microns.

20. A stable, substantially anhydrous organosol consisting essentially of about 5 to 40% by weight of particles of polytetrafluoroethylene and particles of tetrafluoroethylene-hexafluoropropylene copolymer dispersed in an organic solvent which is insoluble or hardly soluble in water, forms an azeotropic mixture with water and does not interfere chemically or physically with the polytetrafluoroethylene and the copolymer, the weight ratio of the polytetrafluoroethylene to the copolymer being 3 : 7 and the particle size of said polytetrafluoroethylene and the copolymer being about 0.01 to 3 microns.

21. The organosol according to claim 20, which contains 25% by weight of the particles of tetrafluoroethylene polymer and particles of tetrafluoroethylene-hexafluoropropylene copolymer.

22. The process according to claim 15, which is followed by minimizing the particles of the polymers at a temperature below about 30°C.

23. The process according to claim 22, wherein the particles are minimized by a ball mill for 30 minutes to 72 hours.

24. A process for preparing the composition according to claim 13, which comprises admixing the organosol according to claim 1 with a film-forming material in a proportion of 95:5 to 10:90 by weight.

* * * * *